(12) United States Patent
Ishii et al.

(10) Patent No.: US 11,073,694 B2
(45) Date of Patent: Jul. 27, 2021

(54) OPTICS OF WEARABLE DISPLAY USING LASER BEAM SCANNER

(71) Applicants: Fusao Ishii, Pittsburgh, PA (US); NTT DOCOMO, Inc., Tokyo (JP)

(72) Inventors: Fusao Ishii, Pittsburgh, PA (US); Mikiko Nakanishi, Tokyo (JP); Kazuhiko Takahashi, Tokyo (JP); Yuji Abrakawa, Tokyo (JP); Keiichi Murakami, Tokyo (JP)

(73) Assignees: Fusao Iskui, Pittsburgh, PA (US); NTT DOCOMO, Inc., Tokyo (JP)

( * ) Notice: Subject to any disclaimer, the term of this patent is extended or adjusted under 35 U.S.C. 154(b) by 0 days.

(21) Appl. No.: 15/843,330

(22) Filed: Dec. 15, 2017

(65) Prior Publication Data
US 2020/0271931 A1 Aug. 27, 2020

Related U.S. Application Data

(63) Continuation-in-part of application No. PCT/US2014/000153, filed on Jun. 23, 2014.

(60) Provisional application No. 62/498,147, filed on Dec. 15, 2016.

(51) Int. Cl.
*G02B 27/01* (2006.01)
*G02B 26/08* (2006.01)
*G02B 26/10* (2006.01)

(52) U.S. Cl.
CPC ..... *G02B 27/0172* (2013.01); *G02B 26/0833* (2013.01); *G02B 26/101* (2013.01); *G02B 2027/0123* (2013.01)

(58) Field of Classification Search
None
See application file for complete search history.

(56) References Cited

U.S. PATENT DOCUMENTS

| 2010/0195022 A1* | 8/2010 | Shikii | G02B 6/0028 349/65 |
| 2013/0127980 A1* | 5/2013 | Haddick | G02B 27/0093 348/14.08 |
| 2015/0178939 A1* | 6/2015 | Bradski | G06F 3/017 345/633 |

* cited by examiner

*Primary Examiner* — Jennifer D. Carruth
(74) *Attorney, Agent, or Firm* — Bo-In Lin

(57) ABSTRACT

A see-through image display system having a laser-beam-scanner has a very small eyebox when a laser beam is directly projected into eye. This invention provides a solution to increase the size of eyebox using a free-form-mirror to create a real image with high NA without exit-pupil-expander.

5 Claims, 13 Drawing Sheets

OPTICS OF WEARABLE DISPLAY USING LASER BEAM SCANNER

CROSS REFERENCE TO RELATED APPLICATIONS

This application is a Provisional Application and a Continuation in Part (CIP) of Patent Application PCT/US2014//000153 filed on Jun. 27, 2014, which is a Non-Provisional filing of a Provisional Application 61/957,258 filed on Jun. 27, 2013.

TECHNICAL FIELD

This invention relates to a display system for projecting an image to a see-through display. The objective of this invention is to create a compact and low cost see-through display such as eye-glass display and Head-up Display to enlarge the eye-box of display.

BACKGROUND ART

Wearable displays get attention in recent years after smart phones are well accepted by the market. Wearable displays provide hands free operation as well as showing image in the distance same as regular sight. There are tremendous needs for wearable displays. However in the past, near eye displays such as Head Mount Display, Head up Display and Eye Glass Type Display not necessarily satisfied viewers, because they were often too heavy, too large, too dark, low resolution, not see through, expensive and small size of image. There are needs for light, small, bright, high resolution, see-through, stealth, inexpensive and large image. This invention provides a new display system which satisfies all of these needs.

As shown in FIG. 1 and FIG. 1A, Kasai et al. disclosed in U.S. Pat. No. 7,460,286 an eye glass type display system that implements see-through capability with a holographic optical element. This display system projects images in the normal direction from display device, more particularly perpendicular direction for a surface of LCD display, and projected light containing an image is led into optical wave guide and reflected toward the eye of viewer. Because of waveguide, the field of view and resolution are very limited.

As shown in FIG. 2 and FIG. 2A, Mukawa et al. in SID 2008 Digest, ISSN/008-0966X/08/3901-0089, "A Full Color Eyewear Display using Holographic Planar Waveguides", disclose an eye glass type display system that implements see-through capability with two plates of holographic optical elements. This system also uses a waveguide which limits resolution and field of view.

As shown in FIG. 3, Levola in SID 2006 Digest, ISSN0006-64•SID 06 DIGEST 0966X/06/3701-0064, Novel Diffractive Optical Components for Near to Eye Displays discloses another implementation locating LCD device in the middle of two eyes, but still it requires large protruded space which enlarge the form factor. The above three types of displays are using either holographic optical element (HOE) or diffractive optical element (DOE) and all of these have some fundamental difficulties of large chroma aberration, cross talk of colors, large field curvature aberration and distortion aberration. Mukawa et al. explained how to reduce cross talk of colors using multiple wave guides, which makes the system heavier and thicker and the efficiency of utilization of light will be lower. Kasai et al. used a single HOE which helped to improve the efficiency of light utilization, although the other aberrations remained and the FOB (field of view) has to be small so that these aberrations will not be conspicuous. This invention will show how these difficulties will be removed.

As shown in FIG. 4 and FIG. 4A, Li et al. disclosed in U.S. Pat. No. 7,369,317 a compact display and camera module attachable to eye glasses. This also requires a thick PBS (polarized beam splitter) and the FOB (field of view) is rather small and this is not stealth and the presence of display is very obvious.

The examples such as FIG. 1 and FIG. 2 successfully demonstrated to public that a wearable display with see-through image is possible using holograms and wave guides. However both of them used LCD as a display and they had a bulky display and optical portions which could not fit inside a temple of glasses. On the other hand, as shown in FIG. 7 and FIG. 8, a compact laser beam scanner (LBS) using only one mirror driven by either electro-static or magnetic forces was developed and it is substantially compact compared with a 2D pixel array type of display, but the beam projected from LBS is very narrow in principle and it creates an extremely small eye-box wherein a viewer can see an image as shown in FIG. 8. Eyebox is defined as a box (width×length×height) in space wherein an image is visible to a viewer as shown in FIG. 9. A small eyebox means that a display is moved in a small distance and a viewer will lose an image. This requires a tight positioning for a viewer to hold a display and often causes uncomfortable viewing. If a display has a large eyebox, a viewer can move freely within the eyebox without losing an image. A LBS projects a very narrow beam to achieve a high resolution image. If the beam is reflected and scattered by a screen, it will provide a large eyebox for a viewer. But if it is used as a direct retina display (meaning that a narrow beam is directly lead into an eye and hits the retina of viewer), a slight shift of beam will cause the loss of image.

FIG. 9 shows an example of Exit Pupil Expander (EPE) which enlarges the eyebox of display. A pair of micro-lens-array (MLA) is used for an EPE as shown in FIG. 10. When such an EPE is combined with a relay lens described in FIG. 9, a unit of head mount display becomes rather large as FIG. 11 in spite of a small display device as LBS.

There is a need to reduce the size of optics for wearable display using LBS. This invention provides a solution for this need without using an EPE.

SUMMARY OF THE INVENTION

The objective of this invention is to create a display without EPE (exit-pupil-expander) using a Free-Form=Mirror to achieve a low cost and compact see-through display such as a wearable display.

As illustrated in FIG. 13. A laser beam (1306) is projected through an aperture for incoming laser beam (1301) toward a LBS (laser-beam-scanner) (1302) which reflects and deflects the beam toward a Free-from-Mirror by changing the angle of mirror. The beams are reflected by the free-form-mirror toward a plane (1304) and form a real image at the plane. This real image can be projected directly or through relay lenses onto a combiner to create a virtual image in front of viewer.

DETAIL DESCRIPTIONS OF THE PREFERRED EMBODIMENTS

The objective of this invention is to create a display without EPE (exit-pupil-expander) using a Free-form=Mirror to achieve a low cost and compact see-through display such as a wearable display.

Figure 1:
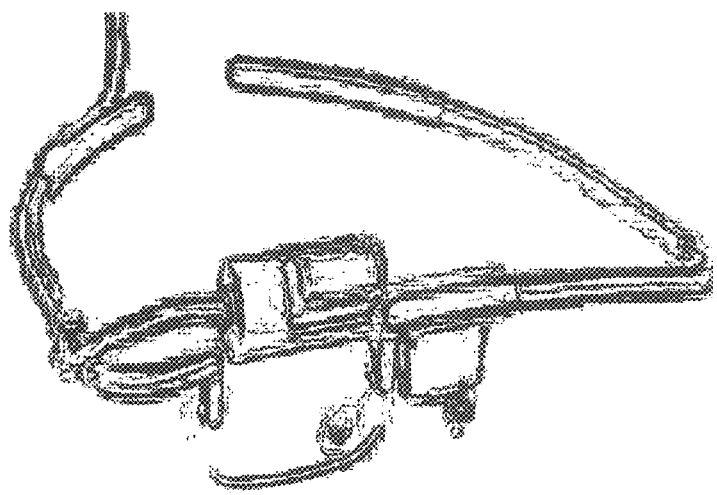
FIG. 1 is a cross sectional view of an image display system of prior art shown by Kasai in his published technical report related to U.S. Pat. No. 7,460,286.
Figure 1A:
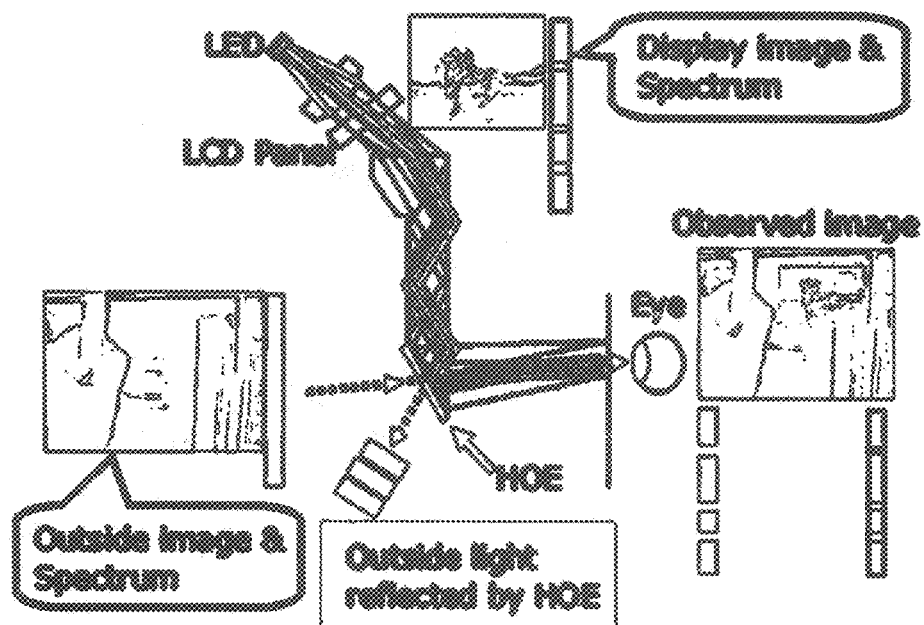
FIG. 1A is a photo of the actual sample which successfully demonstrated see-though capability.
Figure 2:
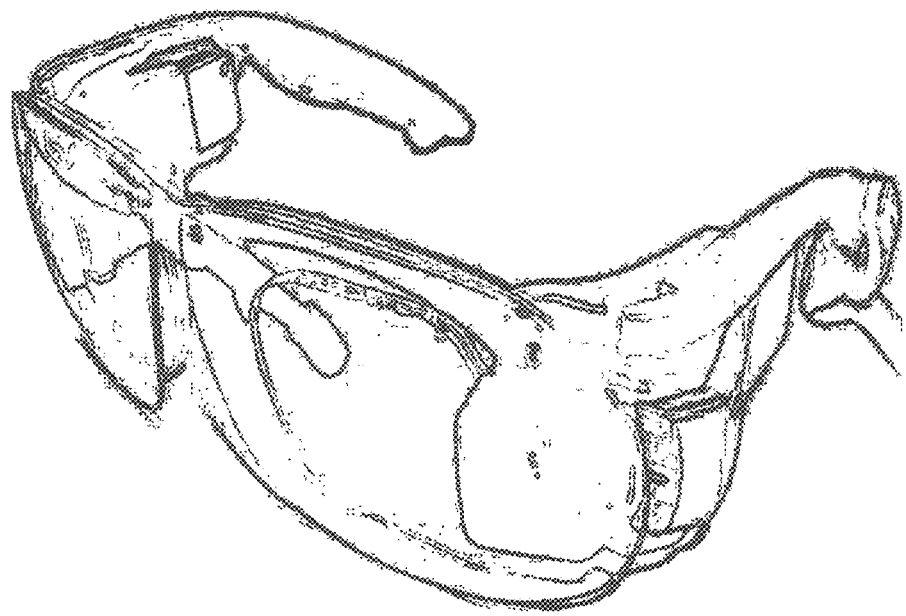
FIG. 2 and FIG. 2A are shown by Mukawa et al. in SID 2008 Digest, ISSN/008-0966X/08/3901-0089, "A Full Color Eyewear Display using Holographic Planar Waveguides". The sample of wearable display in FIG. 2A successfully demonstrated see-through capability.
Figure 2A:
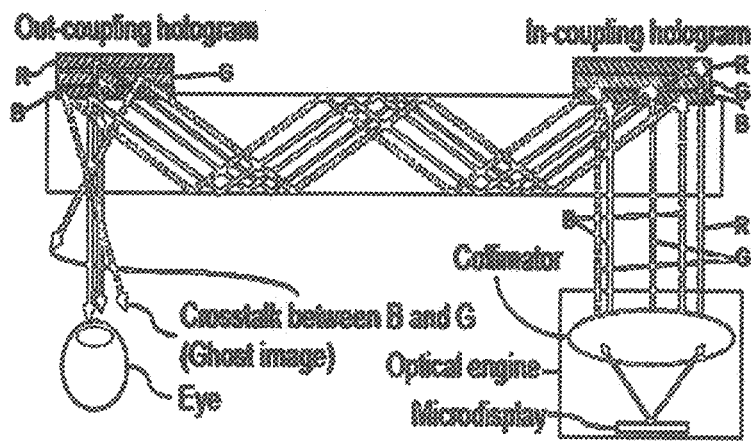
Figure 3:
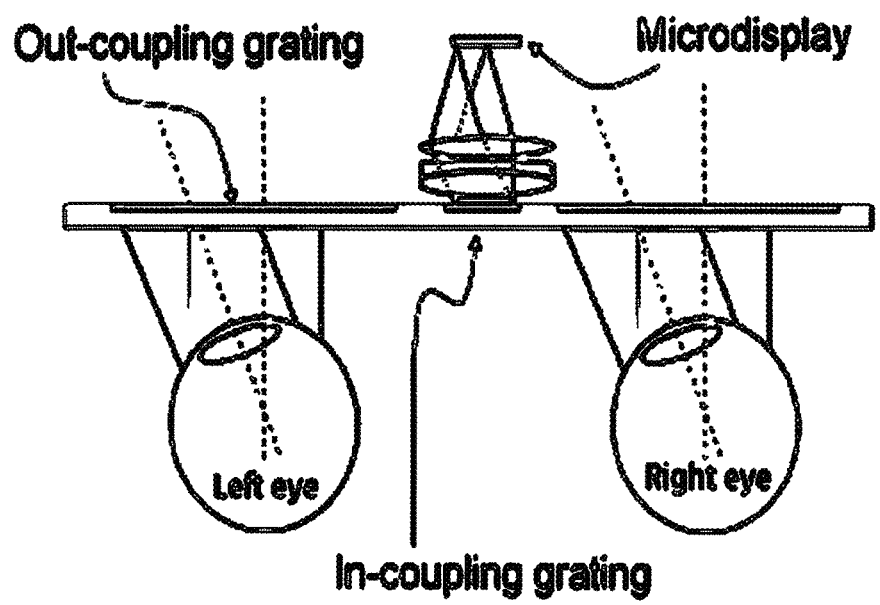
FIG. 3 is another example of prior art and reported by Levola at SID 2006 Digest, ISSN0006-64•SID 06 DIGEST 0966X/06/3701-0064, Novel Diffractive Optical Components for Near to Eye Displays.
Figure 4:
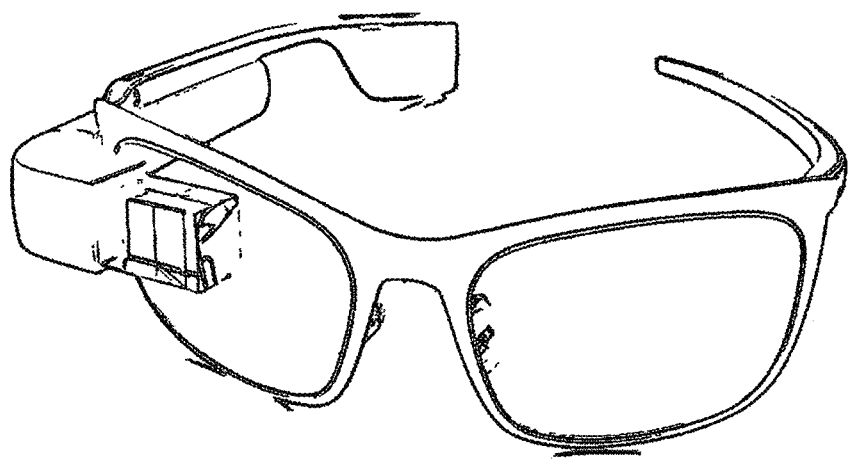
FIG. 4 shows another prior art of wearable display with see-through capability having both a display and a camera described in U.S. Pat. No. 7,369,317.
Figure 4A:
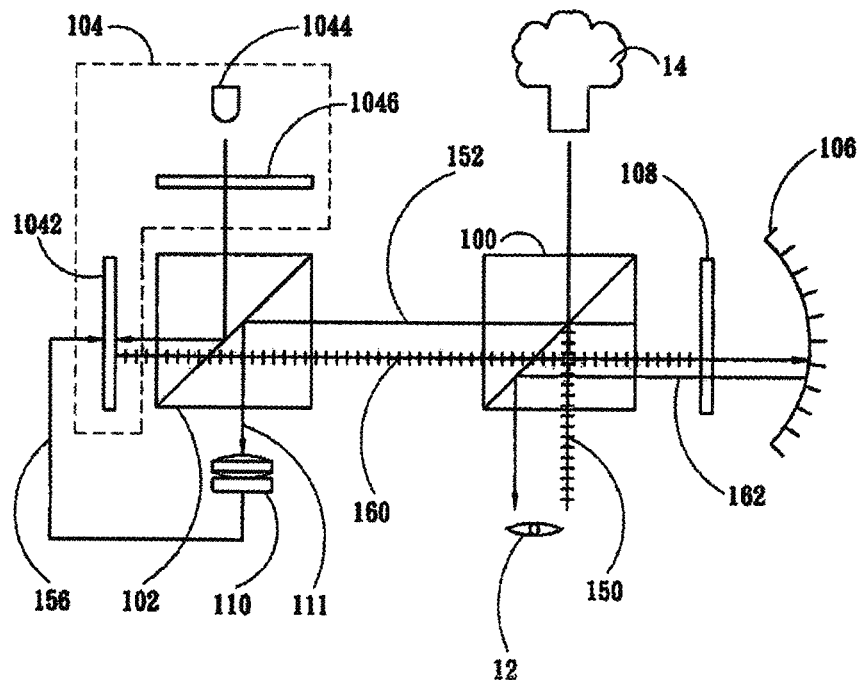
FIG. 4A is an example using a similar configuration of optics.
Figure 5:
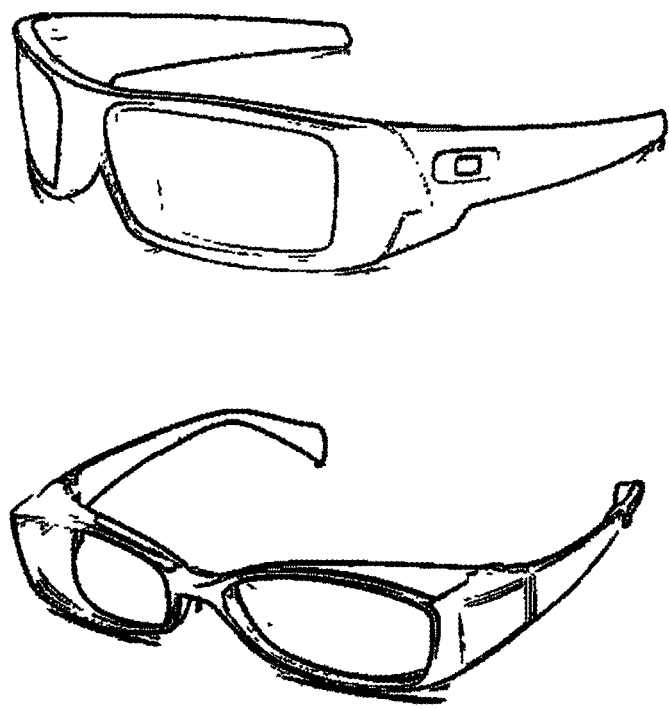
FIG. 5 shows examples of eyeglasses having temples large enough to embed all optics and electronics of this invention, so that the existence of display is not noticeable.
Figure 6:
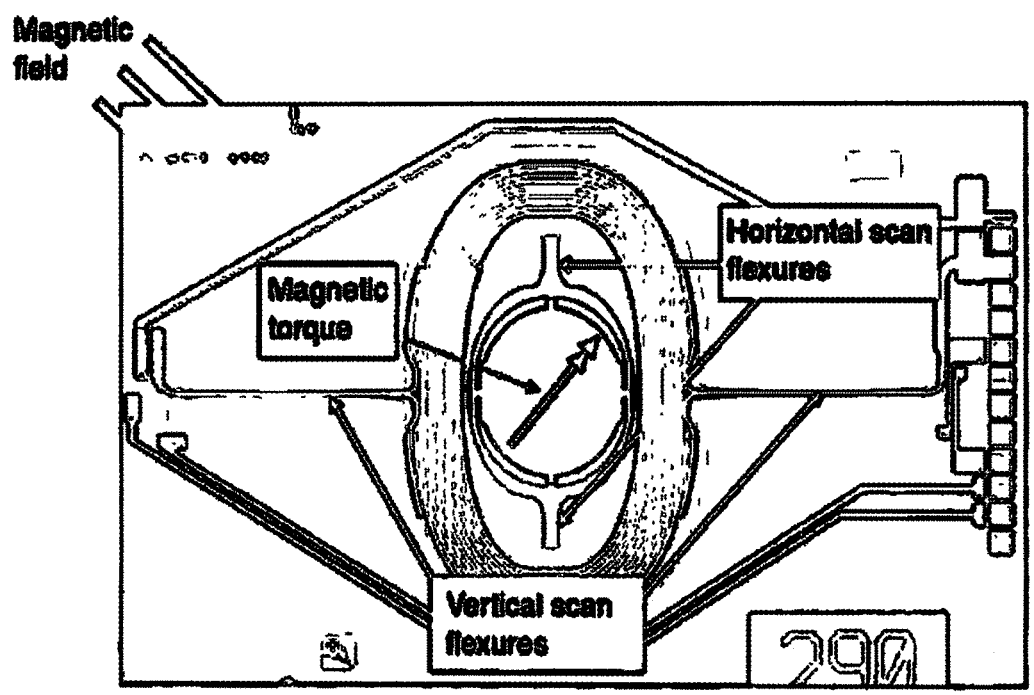
FIG. 6 is an example of laser beam scanner (LBS), wherein there is a Ginbal mirror (marked as "Horizontal scan flexures") which scan a beam horizontally and another flexures marked as "Vertical scan flexures" which scan the beam vertically. The laser beam is scanned horizontally and vertically to create 2 dimensional pictures.
Figure 7:
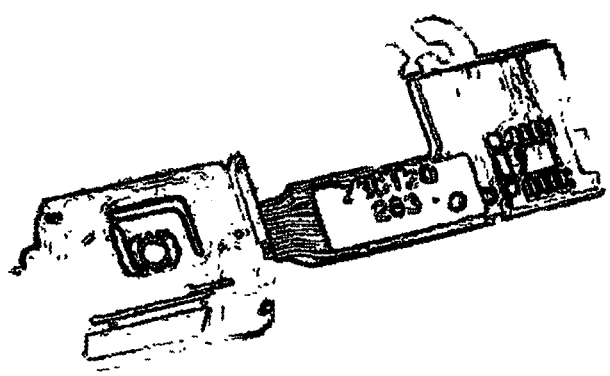
FIG. 7 shows an example of LBS unit with a circuit to drive.
Figure 8:
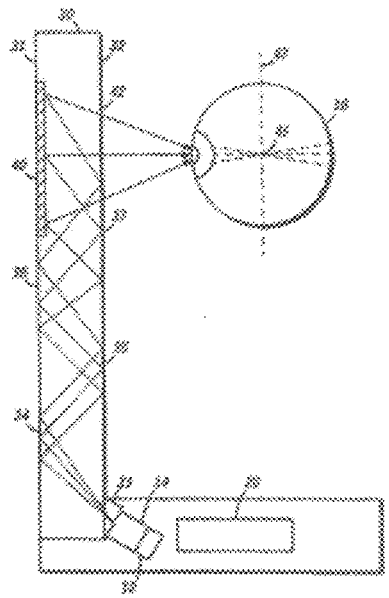
FIG. 8 is an example of a retina display which directly projects a laser beam into the retina of human eye. But this display has an extremely small eyebox and a slight movement of eye will cause missing image, because incoming light beam is very narrow and the pupil of observer is very small (2 to 3 mm diameter). This requires to increase the eyebox.
Figure 9:
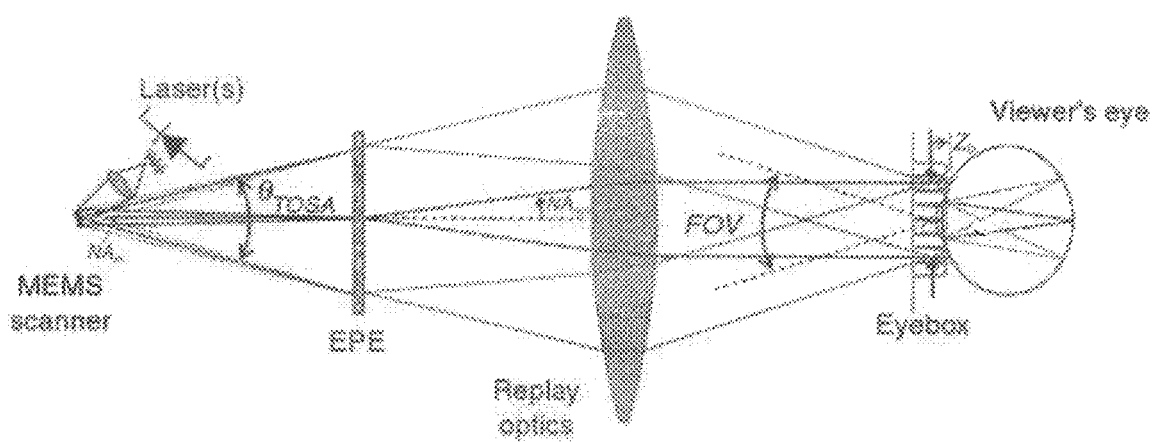
FIG. 9 shows an example of a display using a LBS, an Exit Pupil Expander (EPE) and a set of relay lenses to provide a large eyebox to a viewer. This prior art is too large in front of human eye and it is difficult to use as a see-though-display.
Figure 10:
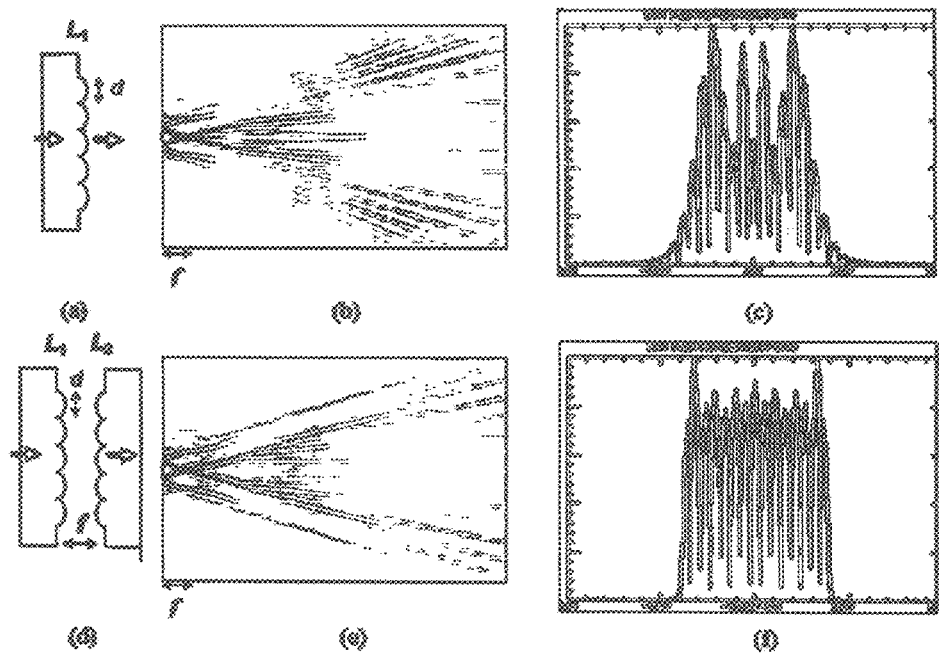
FIG. 10 shows that two micro-lens-arrays (MLA) are used as an EPE. (a) is a single micro-lens-array where each micro-lens diverges incoming light but the uniformity of intensity (b) is not good enough (c) because of the rough pitch of micro-lens. (d) shows a dual micro-lens-array (d) system which shows a substantial improvement of the uniformity of intensity (f) for the same way as FIG. 11 shows an example of head mount display using a LBS, EPE and Relay lenses.
Figure 11:
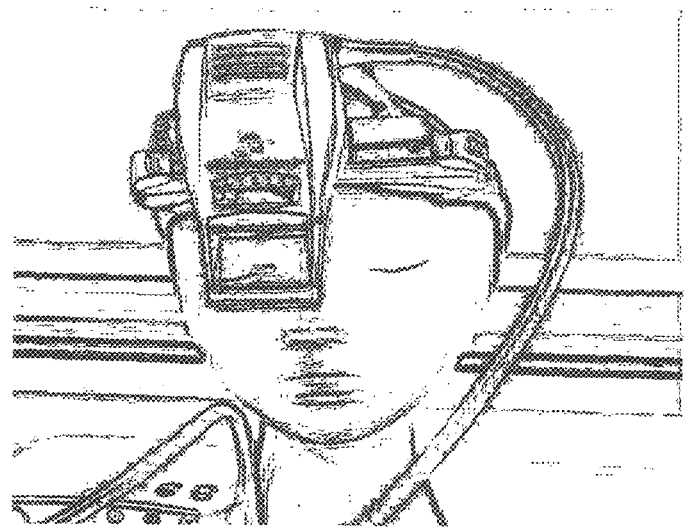
Figure 12:
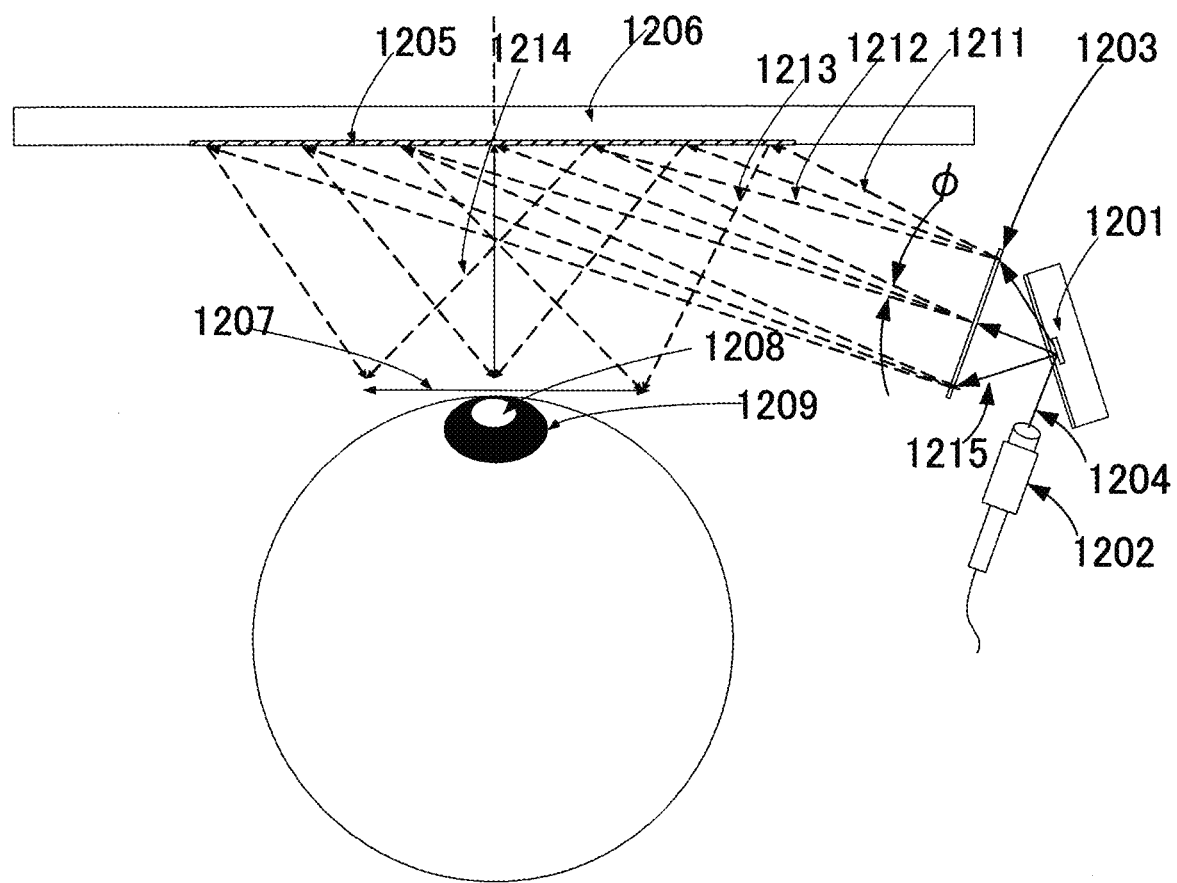
FIG. 12 shows an example an EPE (1203) and a combiner lens (1206).
Figure 13:
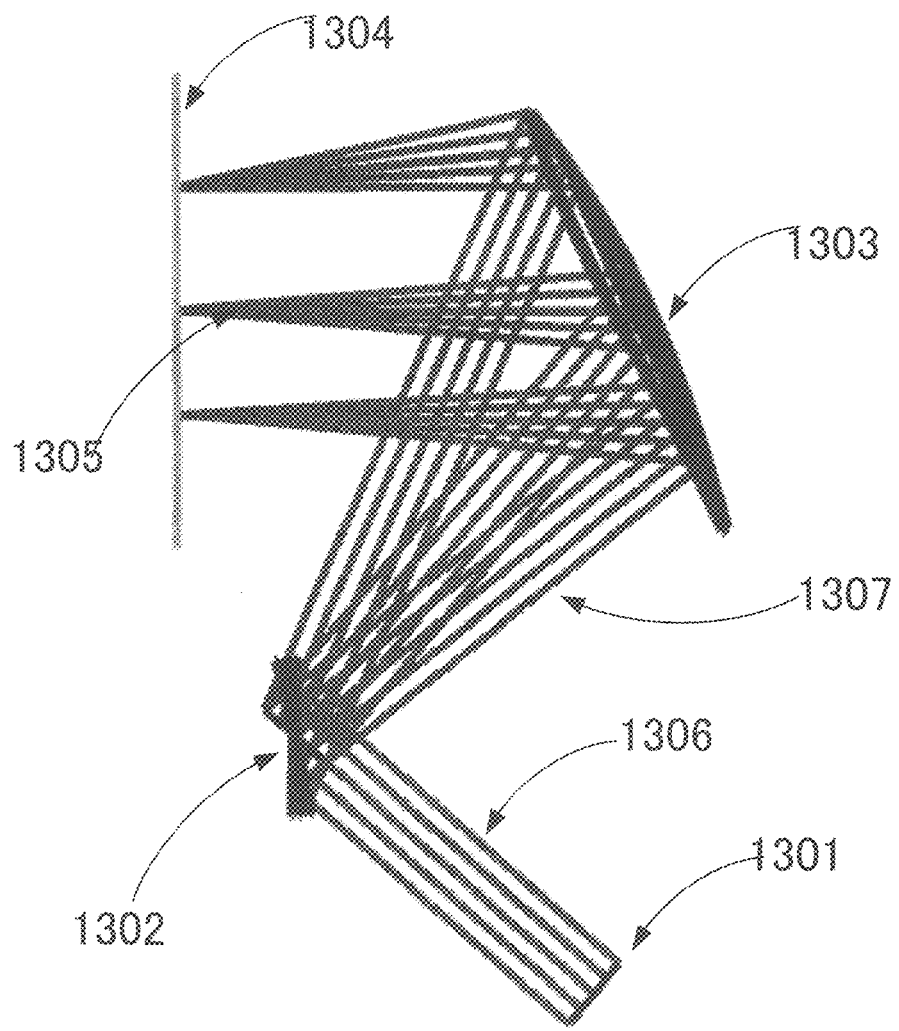
FIG. 13 shows an example of this invention. A collimated laser beam is provided through an aperture (1301) and projected to a laser-beam-scanner (LBS) (1302). The LBS scans the incoming beam (1306) toward a Free-Form-Mirror (1303) that converges the collimated beam (1307) and creates a real image at (1304). Because the image on the plane marked as (1304) is a real image with a large NA, any diffuser or exit-pupil-expander is not necessary.

An example of embodiments of this invention is illustrated in FIG. 13. A laser beam (1306) is projected through an aperture for incoming laser beam (1301) toward a LBS (laser-beam-scanner) (1302) which reflects and deflects the beam toward a Free-from-Mirror by changing the angle of mirror. A free-form-mirror is defined as a mirror having an arbitrary mathematical shape of surface and the surface is not necessarily sphere or elliptic. The beams are reflected by the free-form-mirror toward a plane (1304) and form a real image at the plane. This real image can be projected directly or through relay lenses onto a combiner to create a virtual image in front of viewer.

Figure 14:
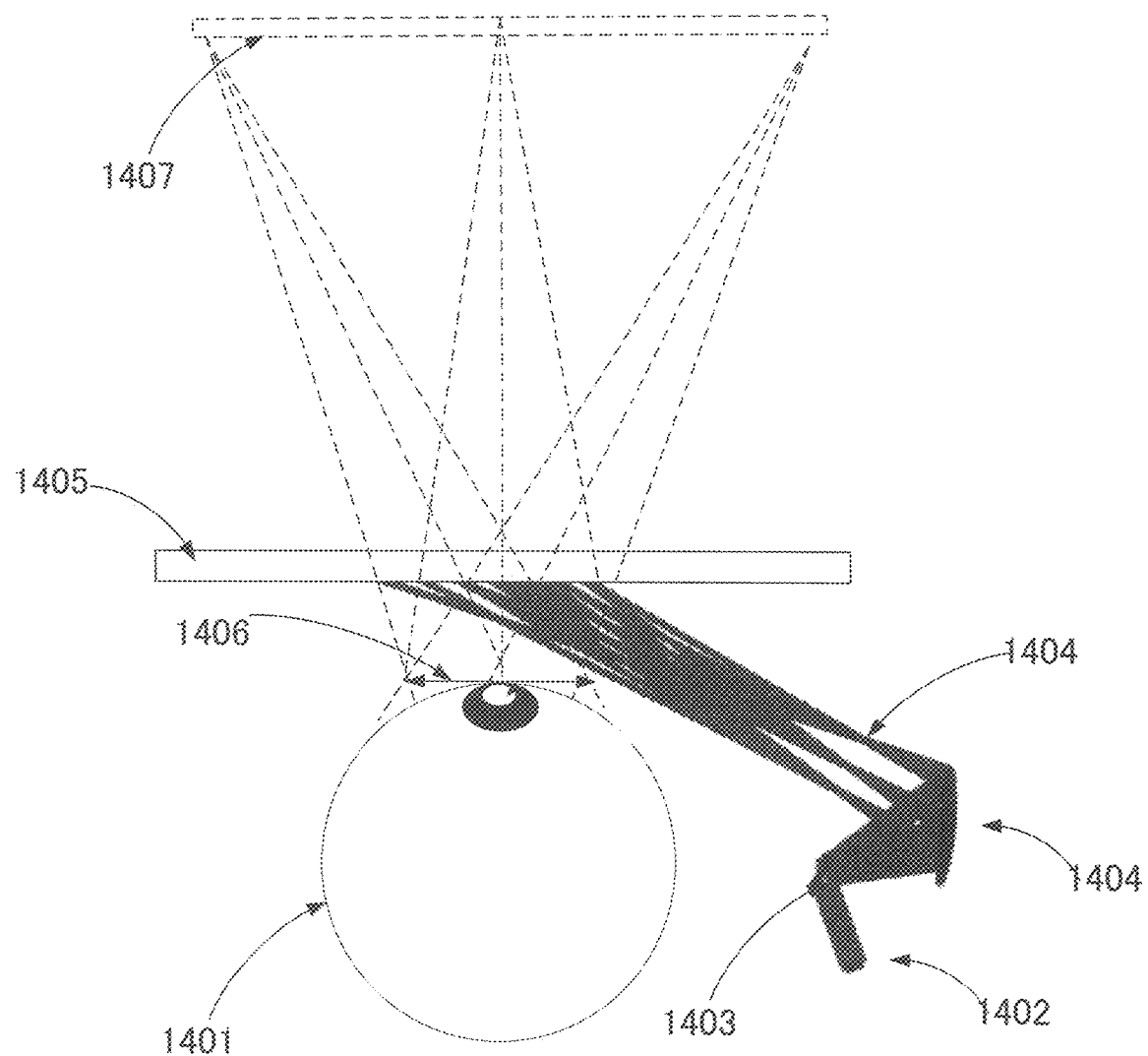
FIG. 14 shows an example of embodiments of this invention. The beams reflected by the free-form-mirror (1404) create a real image at (1404) with a high NA. The real image can be reflected by a combiner (1405) which combines the image (1404) and the image of external scene to create a virtual image (1407) in a distance. After the reflection by the combiner, the beams are projected toward the eye with the width marked as (1406) wherein a viewer can see the image. This width is the size of eye-box.

Another example of embodiments of this invention is shown in FIG. 14. The real image formed by the free-form-mirror (1404 or 1304) is projected to a combiner (1405) directly. The beams are reflected toward the eye of viewer (1401). By extending the reflected lines of beam trajectories in the opposite direction, a virtual image can be created as shown at (1407). The viewer will see the virtual image (1407) in a distance and the eye (1401) can move within the eyebox (1406) without losing the image.

Figure 15:
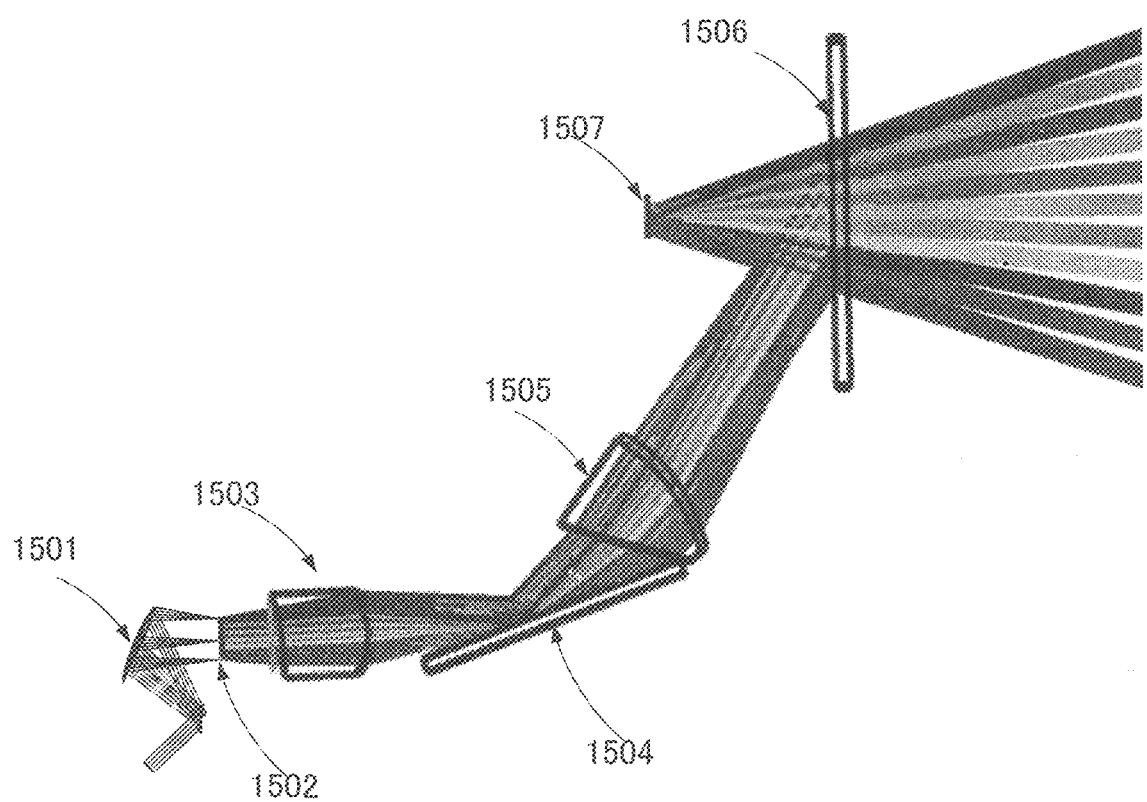
FIG. 15 shows an example of embodiment of this invention using the beam focusing system described in FIG. 13. (1501) is a convex mirror which creates a real image (1502) before the object lens (1503). The combiner (1506) creates a virtual image with a large eyebox (1507).

Another example of embodiments of this invention is shown in FIG. 15. A set of relay lenses and mirror (1503, 1504 and 1505) is placed between the real image from the free-form-mirror and the combiner (1506) and the reflected beams are projected toward the eye of viewer (1507). The plane (1502) does not have any physical substance.

Figure 16:
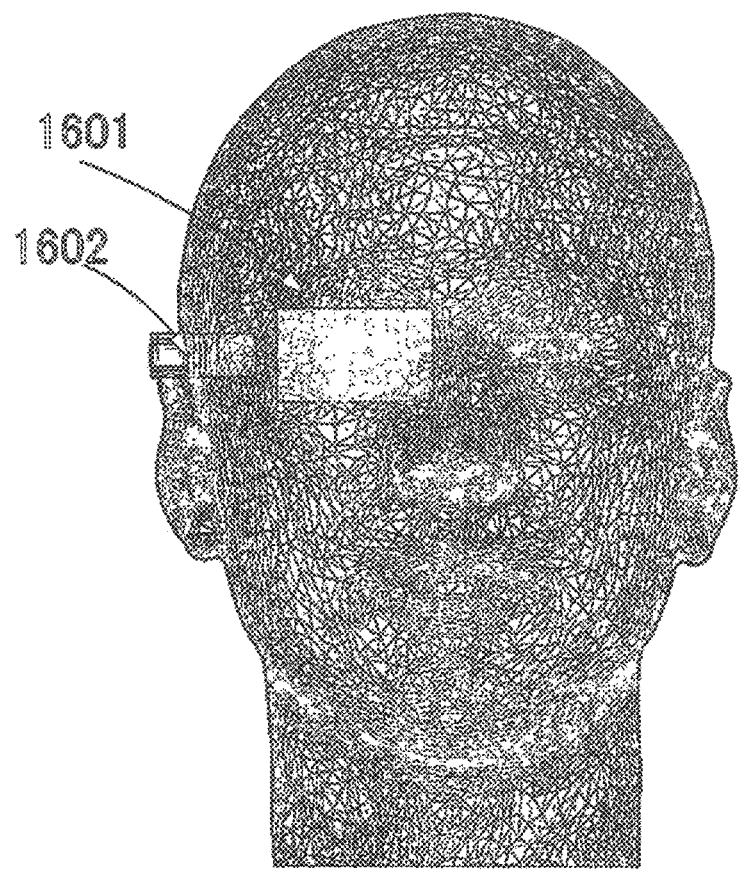
FIG. 16 shows an example of a display using the optics in FIG. 15. The combiner is placed in front of eye. All optics are placed in the temple of eye-glasses.

An example of a display using the optics in FIG. 15 is shown in FIG. 16. The combiner is placed in front of eye. All optics are placed in the temple of eye-glasses.

We claim:

1. A see-through display system comprising:
   a light emitting device for emitting collimated beams representing a collimated laser beam image to a laser beam scanner for scanning the collimated laser beam to a convex free form mirror to expand the collimated laser beam image to an expanded a real image to project the expanded real image to a light transmissive combiner; and the light transmissive combiner is disposed in front of a human pupil on the see through device for reflecting the expanded real image projected thereon as a reflected virtual image to combine with an external scene for viewing by the human pupil without requiring an exit pupil expander (EPE).

2. The see-through display system of claim 1 wherein:
   the light emitting device further comprises laser emitting diodes (LED) for emitting the collimated laser beams to the laser beam scanner.

3. The see-through display system of claim 1 further comprising:

a set of relay lenses between said combiner and said convex free form mirror to improve a resolution of the virtual image.

4. The see-through display system of claim 1 further comprising:
an eyeglass for embodying and supporting the display device thereon.

5. The see-through display system of claim 1 further comprising:
a head-up display device for embodying and supporting the display device thereon.

* * * * *